(12) United States Patent
Kaneda et al.

(10) Patent No.: US 7,130,319 B1
(45) Date of Patent: Oct. 31, 2006

(54) ALL-FIBER Q-SWITCHED LASER

(75) Inventors: Yushi Kaneda, Tucson, AZ (US); Christine Spiegelberg, Tucson, AZ (US); Jihong Geng, Tucson, AZ (US); Yongdan Hu, Tucson, AZ (US)

(73) Assignee: NP Photonics, Inc., Tucson, AZ (US)

( * ) Notice: Subject to any disclaimer, the term of this patent is extended or adjusted under 35 U.S.C. 154(b) by 228 days.

(21) Appl. No.: 10/633,014

(22) Filed: Aug. 1, 2003

(51) Int. Cl.
*H01S 3/11* (2006.01)

(52) U.S. Cl. .............................. 372/10; 372/14; 372/6

(58) Field of Classification Search ............... 372/10, 372/6, 14
See application file for complete search history.

(56) References Cited

U.S. PATENT DOCUMENTS

| | | | |
|---|---|---|---|
| 5,237,576 A * | 8/1993 | DiGiovanni et al. | 372/6 |
| 5,561,675 A * | 10/1996 | Bayon et al. | 372/6 |
| 6,188,712 B1 * | 2/2001 | Jiang et al. | 372/96 |
| 6,480,637 B1 * | 11/2002 | Yao | 385/11 |
| 6,816,514 B1 * | 11/2004 | Jiang et al. | 372/6 |
| 2004/0057471 A1 * | 3/2004 | Shevy et al. | 372/6 |

OTHER PUBLICATIONS

Haiwen Cai; Xia Jiangzhen; Hao Zhao; Chen Gaoting; Fang Zujie; Kim, I.S.; Yohee Kim; Optical Fiber Communication Conference and Exhibit, 2002. OFC 2002 Mar. 17-22, 2002 pp. 654-655.*

Anthony E. Siegman, "Laser Q-Switching", University Science Books, ISBN 0-935702-11-5, 1996, p. 1003-1007.
Walter Koechner, "Electrooptical Q-Switches", Solid State Laser Engineering—Third Revised and Updated Edition.
Nobuyuki Imoto et al., "Birefringence in Single-Mode Optical Fiber due to Elliptical Core Deformation and Stress Anisotropy", IEEE Journal of Quantum Electronics, vol. QE-16, No. 11, Nov. 1980, pp. 1267-1271.
Takeshi Imai et al., "A Wavelength Tunable Q-Switched Erbium-Doped Fiber Laser with Fiber Bragg Grating Mirrors", Jpn. J. Appl. Phys., vol. 35 (1996), pp. 1275-1277.
Ana Rosa Boyain et al., "Low-frequncy and high-frequency all-fiber modulators based on birefringence modulation", Applied Optics, vol. 38, No. 30, Oct. 20, 1999, pp. 6278-6283.
H.H. Kee, "A stable narrow linewidth Q-switched Er-doped fibre laser", CLEO '99, pp. 246-247.
T. Oleskevich et al., "High-power Q-switched fiber laser", Proceedings of the SPIE—The International Society for Optical Engineering , vol. 2041, 1994, pp. 291-297.

* cited by examiner

*Primary Examiner*—Minsun Oh Harvey
*Assistant Examiner*—Tod T. Van Roy
(74) *Attorney, Agent, or Firm*—Eric A. Gifford (57) ABSTRACT

An all-fiber Q-switched laser includes a gain fiber spliced between narrowband and broadband fiber gratings that define a polarization-dependent resonant cavity. The narrowband grating is, for example, formed in a PM fiber to create a polarization-dependent reflection band. A modulator applies stress to the fiber chain to induce birefringence and switch the cavity Q-factor to alternately store energy in the gain fiber and then release the energy in a laser pulse.

21 Claims, 8 Drawing Sheets

ALL-FIBER Q-SWITCHED LASER

BACKGROUND OF THE INVENTION

1. Field of the Invention

This invention relates to Q-switched lasers and more specifically to an all-fiber embodiment of a Q-switched laser.

2. Description of the Related Art

Q-switching is a widely used laser technique in which a laser pumping process is allowed to build up a much larger than usual population inversion inside a laser cavity, while keeping the cavity itself from oscillating by removing the cavity feedback or greatly increasing the cavity losses. After a large inversion has been developed, the cavity feedback is restored to its usual large value, hence bringing the Q-factor to a high value, producing a very short, intense burst which dumps all the accumulated population inversion in a single short laser pulse. Modulation of the cavity produces repetitive pulses. Lasers, Anthony E. Siegman, University Science Books, 1986, pp. 1004–1007.

As illustrated in FIGS. 1a through 1d, the cavity loss 10 is initially set at some artificially high value—that is, at an artificially low value of the laser cavity $Q_c$—while the inversion 12, hence the gain and the stored energy, in the laser medium are pumped up to a value much larger than normally present in the oscillating laser. The cavity loss is then suddenly lowered to a more normal value (higher $Q_c$) so that the round-trip gain after switching is much larger than the cavity loss. The initial spontaneous emission or noise level in the laser cavity then immediately begins to build up at an unusually rapid rate, soon developing into a rapidly rising and intense burst, or "giant pulse" 14 of laser oscillation. The oscillation signal rapidly drives the inversion 12 down well below the new cavity loss level, after which the oscillation signal in the cavity dies out nearly as rapid as it rose. The peak power in the Q-switched pulse can be several orders of magnitude more intense than a cw laser created in the same laser with the same pumping rate.

Figure 1A:
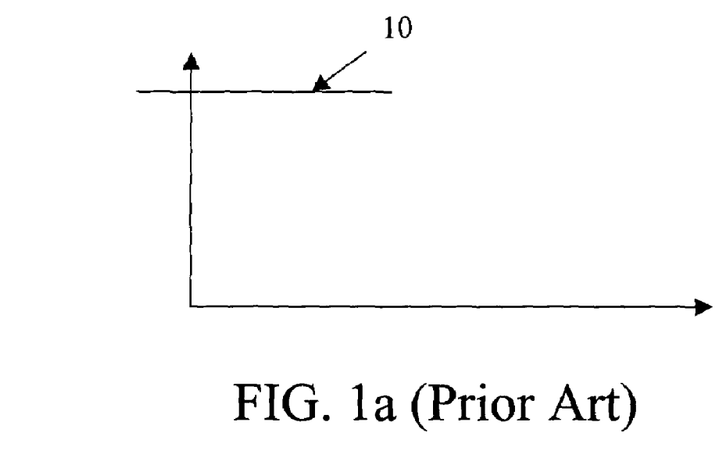
FIGS. 1a–1d, as described above, is a schematic illustrating the fundamental dynamics of laser Q-switching.
Figure 1B:
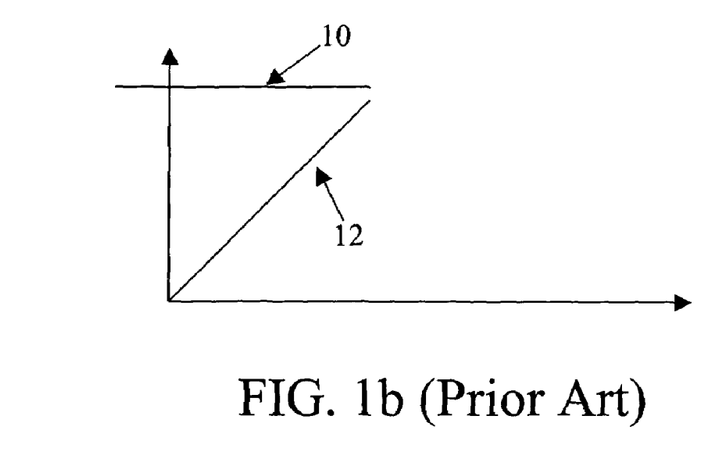
Figure 1C:
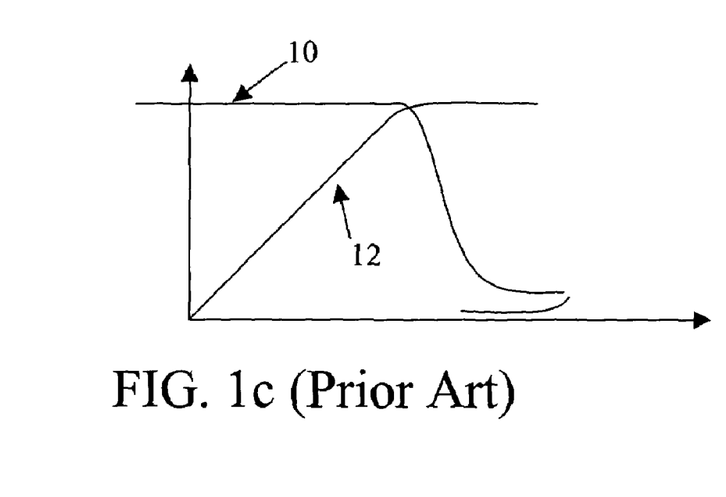
Figure 1D:
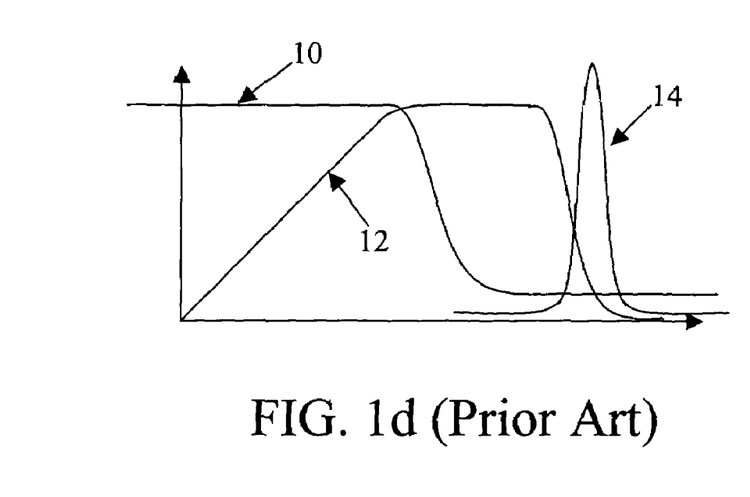
Figure 2A:
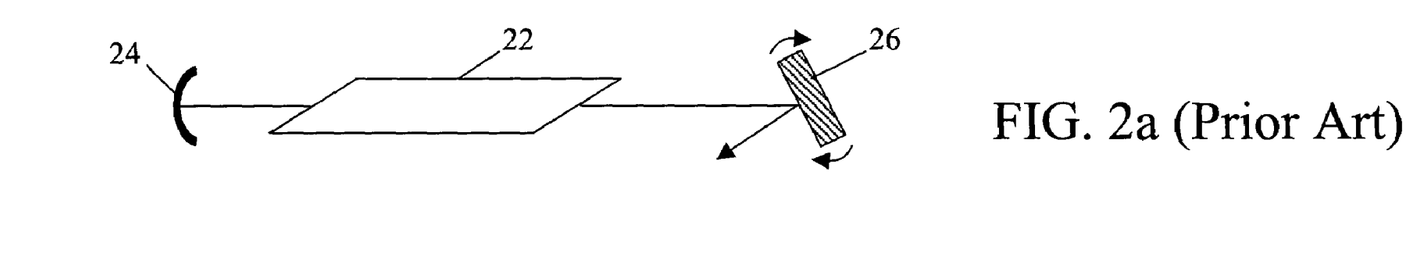
FIGS. 2a–2c, as described above, are known Q-switched lasers.
Figure 2B:
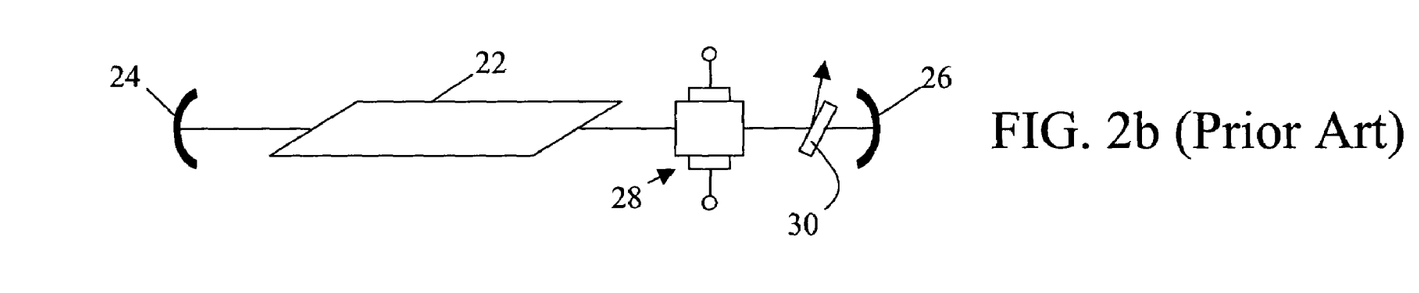
Figure 2C:
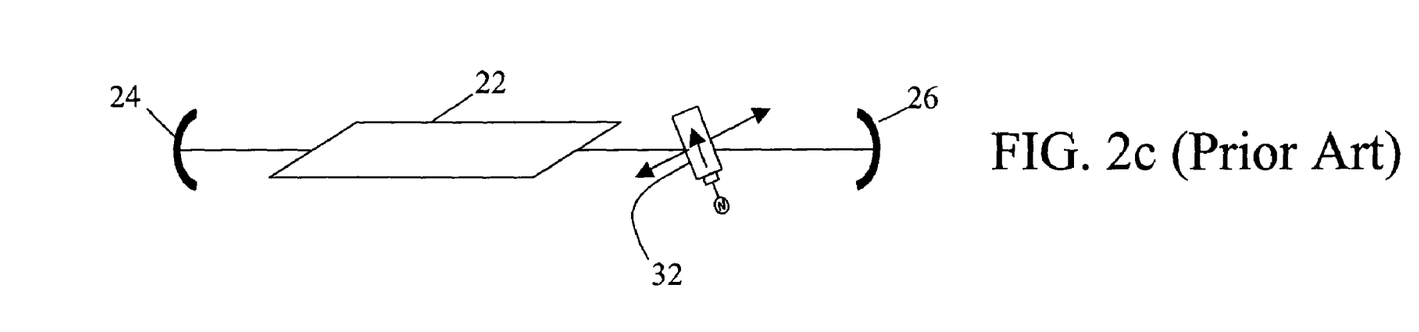

Some of the more common Q-switching methods employed in practical laser system are shown in FIGS. 2a through 2c. The laser cavity includes a gain medium 22 and a pair of mirrors 24 and 26. As shown in FIG. 2a, mirror 26 is rotated (spinning motor shaft) so that the laser is oscillated only during the brief interval when mirror 26 is aligned with mirror 24. As shown in FIG. 2b, an electrooptic crystal 28 which becomes birefringent under the influence of applied voltage and one or more prisms 30 are placed inside the cavity. The birefringent crystal 28 rotates the polarization of the light energy so that it is coupled out of the cavity by the prism 30. Electrooptic Q-switching provides fast switching with precise timing and good stability but the repeat rate is relatively slow and the crystal and pulse source are fairly expensive, as the voltage needed to switch one polarization to the other is more than a few hundred volts. As shown in FIG. 3c, an rf acoustic wave created in the optical material 32 at the Bragg condition diffracts light out of the cavity to lower the Q. Acoustic modulators have a fast repeat rate but are expensive and a slower switch speed as well as limited aperture size.

There remains a need for an inexpensive and reliable Q-switched laser that provides for narrow pulse widths and fast repeat rates.

SUMMARY OF THE INVENTION

The present invention provides an inexpensive all-fiber Q-switched laser with narrow pulse widths and fast repeat rates.

This is accomplished with a fiber chain in which a gain medium is provided between narrow and broadband fiber gratings that define a polarization-dependent resonant cavity. A pump source couples energy into the fiber chain to pump the gain medium. A modulator applies stress to the fiber chain to induce birefringence and switch the cavity Q-factor to alternately store energy in the gain fiber and then release the energy in a laser pulse.

In one embodiment, the narrowband fiber grating is formed in a polarization maintaining (PM) fiber creating two reflection bands that correspond to different polarization modes. The broadband grating has a reflection band that is aligned to one of the PM fiber's reflection bands so that the normal Q-factor is high. The application of stress to the fiber chain changes the polarization of light oscillating in the fiber chain to reduce the Q-factor and store energy in the gain fiber. Removal of the stress returns the birefringence, hence polarization to its initial state thereby increasing the Q-factor and quickly releasing the energy in a laser pulse.

In another embodiment, some portion of the fiber chain comprises a polarization-dependent fiber whose transmission depends on the polarization of the oscillating light energy.

Stress induced birefringence of the fiber chain switches the Q-factor to store energy and then release energy in a laser pulse.

In another embodiment, the fiber gratings are formed in passive silica fiber and fusion spliced to an active oxide-based multi-component glass fiber. Multi-component glasses support higher concentrations of rare-earth dopants and thus higher output power or single-frequency output.

These and other features and advantages of the invention will be apparent to those skilled in the art from the following detailed description of preferred embodiments, taken together with the accompanying drawings, in which:

DETAILED DESCRIPTION OF THE INVENTION

Stress-induced birefringence of an all-fiber polarization-dependent resonant cavity provides an inexpensive Q-switched laser with narrow pulse widths, high repetition rates and peak powers. In general, the pulse width is less than 100 ns, the repetition rate is greater than 1 kHz and the peak power is greater than 1 W.

Figure 3:
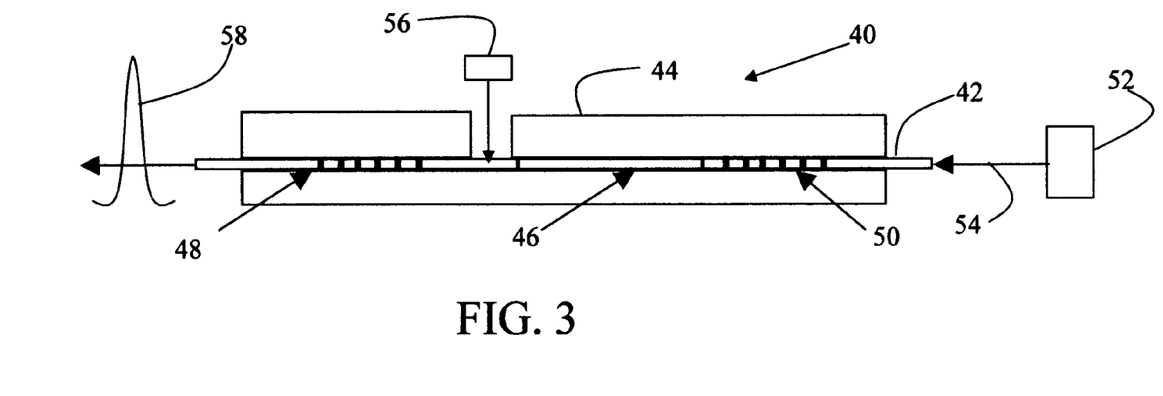
FIG. 3 is an all-fiber embodiment of a stress-induced birefringent Q-switched laser in accordance with the present invention.

As shown in FIG. 3, an all-fiber Q-switched laser 40 includes a fiber chain 42 held in a mounting fixture 44. The fiber chain includes a gain medium 46 formed between narrow and broadband fiber gratings 48 and 50 that define a polarization-dependent resonant cavity. A pump source 52 such as a single or multi-mode laser diode couples energy 54 into fiber chain 42 to pump gain medium 46. A modulator 56 applies mechanical stress to a portion of the fiber chain to affect its birefringence and change the cavity Q-factor. Typically, in the normal or unstressed state, the cavity losses are low (high Q) to sustain lasing. Thus, the stress-induced birefringence lowers the Q so that cavity losses exceed gain and the pump energy is stored in the gain medium. When the stress is removed, the Q returns to its normal high value and the cavity releases the energy in a laser pulse 58. Alternately, the cavity could be configured so that the stress-induced state corresponds to a high Q factor.

Figure 4A:
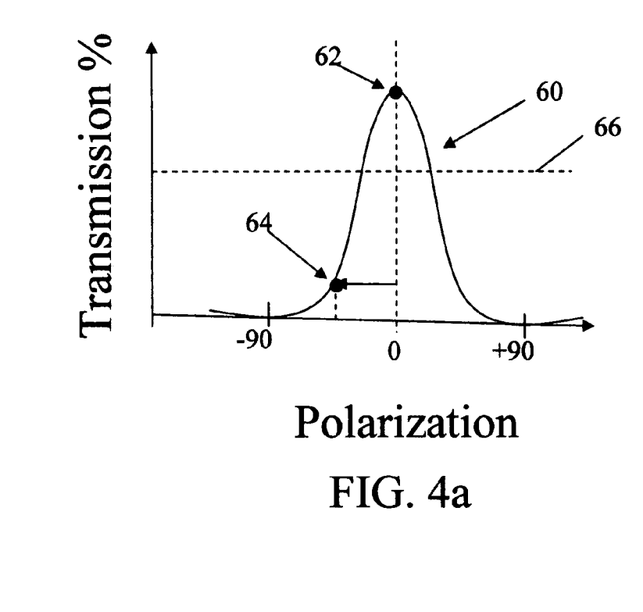
FIGS. 4a and 4b illustrate polarization dependence and stress-induced birefringence.
Figure 4B:
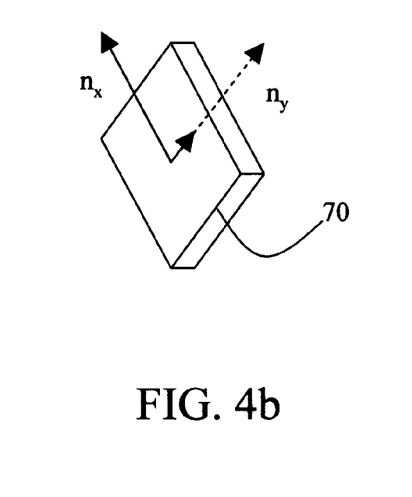

The polarization dependence of the resonant cavity and the stress-induced birefringence are illustrated in FIGS. 4a and 4b. Polarization dependence is created by either forming at least a portion of the fiber chain with a fiber whose transmission properties are polarization dependent or forming the narrowband grating on a polarization maintaining fiber (see FIG. 5).

FIG. 4a is a plot 60 of the transmission (reflectance) versus polarization state of the light at the wavelength where the gratings are aligned to lase. For purposes of explanation only, we assume that the light in the cavity is ordinarily linearly polarized with a vertical or "V-polarization" and the cavity is configured to have a high transmission (reflectance) 62 for V-polarized light at the laser wavelength. In the ordinary unstressed state, the cavity losses are low and the cavity would sustain laser oscillation. When the retardance having the optical axis 45 deg. with respect to V/H, vertical or horizontal, of the stress induced birefringence is quarter-wave or π/2, the light is rotated to a horizontal or "H-polarization" at which the transmission (reflectance) 64 is below the threshold 66 needed to sustain laser oscillation. The birefringence need only be sufficient to shift the polarization to a point on the curve below the threshold. The combination of stress-induced birefringence with a polarization-dependent cavity provides an efficient Q-switched laser.

FIG. 4b illustrates the concept of stress-induced birefringence. A material that displays two difference indices of refraction $n_x$ and $n_y$ is said to be birefringent. It is well known that the application of mechanical stress to an isotropic material (same refractive index in all directions) will change the refractive indices and induce birefringence. For example, an isotropic material 70 such as an optical fiber has indices of refraction $n_x$ and $n_y$ of equal value. V-polarized light traveling through this isotropic material will be retarded by an equal amount in all directions and its polarization will be unaffected. However, the application of stress to the fiber will, for example, reduce refractive index $n_y$ and induce birefringence, when the direction of polarization is not the direction of one of the optical axis of birefringence. The same light propagating through the now birefringent material will be retarded by different amounts affecting the polarization. In the example given above, if the induced birefringence is quarter-wave a double-pass through the material will change V-polarized light to H-polarized light, if the axis of birefringence, which is a function of the orientation of the stress, is 45 deg. to the vertical/horizontal.

Figure 5:
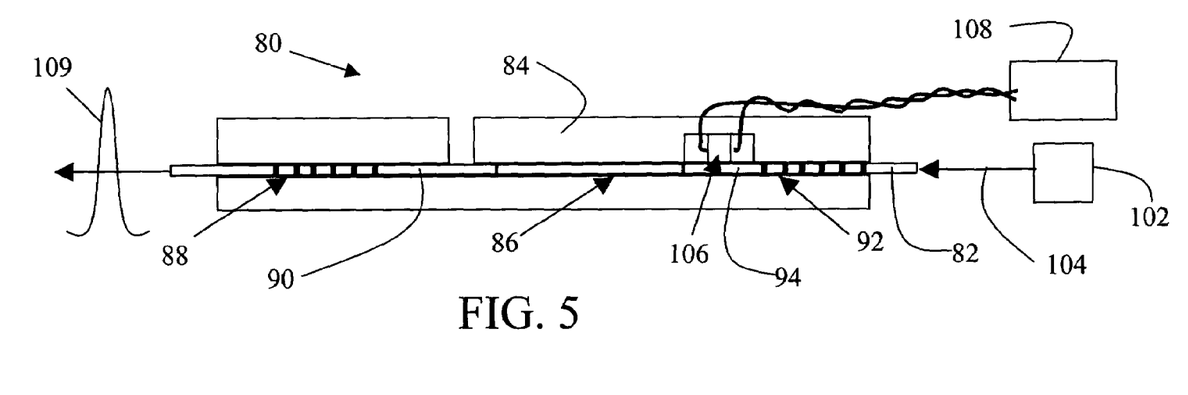
FIG. 5 is another all-fiber embodiment of a stress-induced birefringent Q-switched laser.
Figure 6:
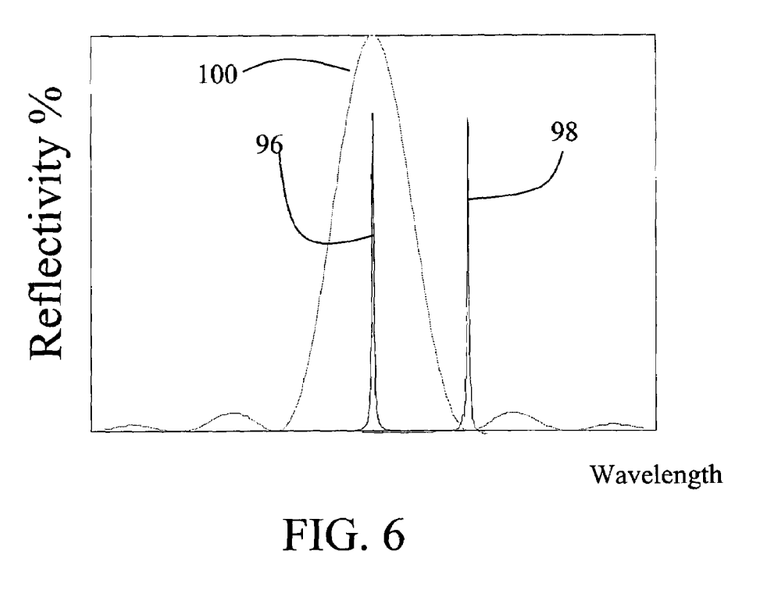
FIG. 6 is a plot of reflectivity versus wavelength for a narrowband grating formed in a polarization maintaining fiber.

As shown in FIG. 5, an all-fiber Q-switched laser 80 includes a fiber chain 82 held in a mounting fixture 84. The fiber chain includes a gain fiber 86 spliced between a narrowband fiber grating 88 fabricated in a polarization maintaining (PM) fiber 90 and a broadband fiber grating 92 fabricated in a fiber 94 (may or may not be PM fiber). As shown in FIG. 6, the narrowband grating, provided it is sufficiently narrow, e.g. 0.05 nm for 1 um laser wavelength, resolves two reflection bands 96 and 98 that correspond to different polarization modes, e.g. V and H polarization. The broadband grating reflection band 100 overlaps, and is preferably aligned with, one of the two reflection bands, shown here as band 96, to define a polarization dependent cavity with a high Q factor for light at the laser wavelength $\lambda_0$ and the correct polarization. A pump source 102 couples energy 104 into fiber chain 82 to pump gain fiber 86.

A piezoelectric transducer (PZT) 106 is mounted on an exposed portion of fiber chain 82 and in response to an external signal from signal source 108 applies mechanical stress to the fiber chain to affect its birefringence and change the cavity Q-factor to generate a giant pulse 109. The PZT is a simple, low cost device that can be mounted on the fiber chain in a compact package. The PZT operates at less than 50V, which is very important for purposes of safety qualification, has a fast response time and is capable of fast repetitions.

The stress-induced birefringence of an all-fiber polarization-dependent resonant cavity can be quantitatively analyzed in the following Jones-Matrix analysis. The round-trip Jones-Matrix RT can be written as $$RT = \begin{pmatrix} 1 & 0 \\ 0 & 1 \end{pmatrix} [\Omega] \begin{pmatrix} e^{i\frac{\phi}{2}} & 0 \\ 0 & e^{-i\frac{\phi}{2}} \end{pmatrix} [\Omega]^{-1} \begin{pmatrix} R & 0 \\ 0 & 0 \end{pmatrix} [\Omega] \begin{pmatrix} e^{i\frac{\phi}{2}} & 0 \\ 0 & e^{-i\frac{\phi}{2}} \end{pmatrix} [\Omega]^{-1}$$

$$[\Omega] = \begin{pmatrix} \cos\Omega & -\sin\Omega \\ \sin\Omega & \cos\Omega \end{pmatrix}$$

where $\Omega$, $\phi$, and R represent the angle between the stress-birefringence and the axis of the PM fiber 90, the amount of birefringence, and the reflectivity of the narrowband grating 88. The reflectivity of the non-PM FBG 92 is assumed to be 1 for both polarizations, and the reflectivity of the narrowband grating at the other (nonoperating) polarization is stipulated to zero, as it is for any wavelength within the entire reflection band of the broadband FBG. The eigenvalues of the Jones-Matrix RT are 0 and $R(\cos\phi + i\sin\phi\cos 2\Omega)$, each representing the cold-cavity "gain" (i.e., 1-loss) for the nonoperational polarization and the operational polarization, respectively. One of the eigenvalues is zero, indicating the resonator supports only one polarization mode. The other (non-zero) eigenvalue indicates the gain/loss of the cavity. The eigenvalue can be a complex number as it represents the field quantity. The round-trip loss of the cavity depends on the amount of birefringence, which can be changed by applying a waveform to the PZT. The round-trip loss also depends on the orientation of the stress with respect to the PM axis, which must be pre-aligned. In an extreme example, when the stress birefringence is oriented 45° to the axis of the PM fiber and the retardance is 90° (quarter-wave), the cavity is completely suppressed, as the operational polarization will be switched to the other polarization state after one round-trip. By changing the cavity loss rapidly, effective Q-switching will be accomplished by a very simple configuration.

Figure 7A:
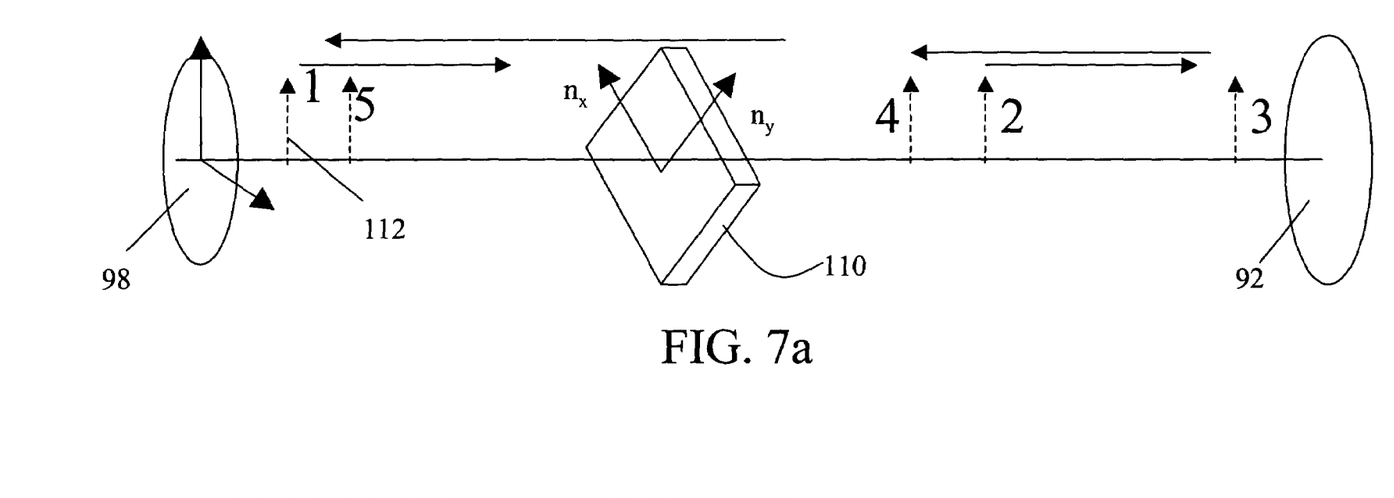
FIGS. 7a and 7b are diagrams illustrating a non-birefringent cavity.
Figure 7B:
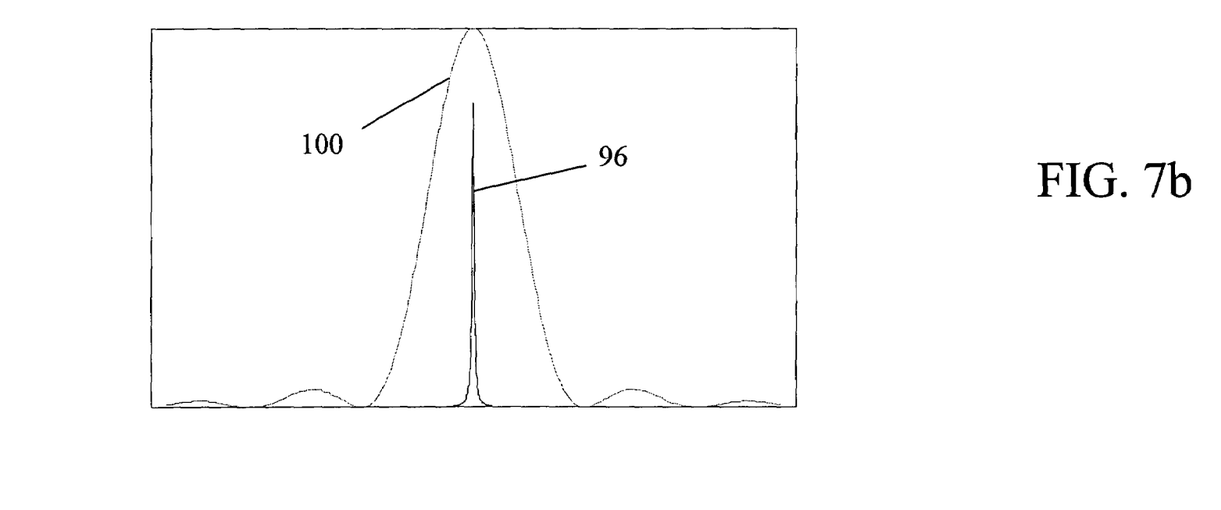

As shown in FIGS. 7a and 7b, without stress being applied to the fiber chain, the material 110 remains isotropic, i.e. $n_x$ and $n_y$ are the same. Light propagates in the cavity from the narrowband fiber grating 98 at one end (1) through the fiber chain (2) reflects off the broadband grating 92 (3) back through the fiber chain (4) and to the narrowband grating 98 (5) and retains its original polarization, shown here as a V-polarization 112. As a result, the reflection band 96 for V-polarized light is aligned to the broadband reflection band 100. This defines a low loss high Q cavity capable of sustaining laser oscillation.

Figure 8A:
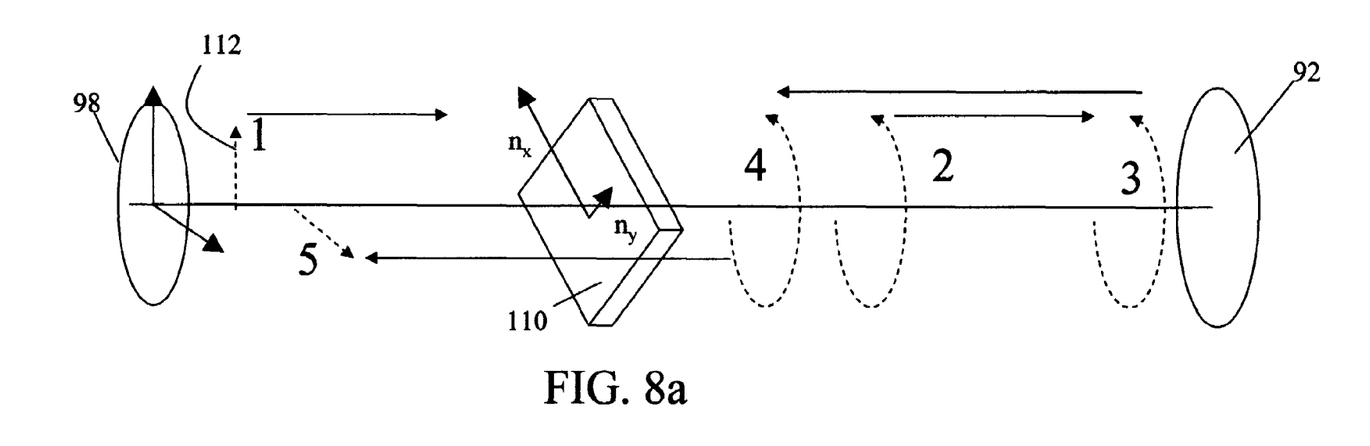
FIGS. 8a and 8b are diagrams illustrating a birefringent cavity.
Figure 8B:
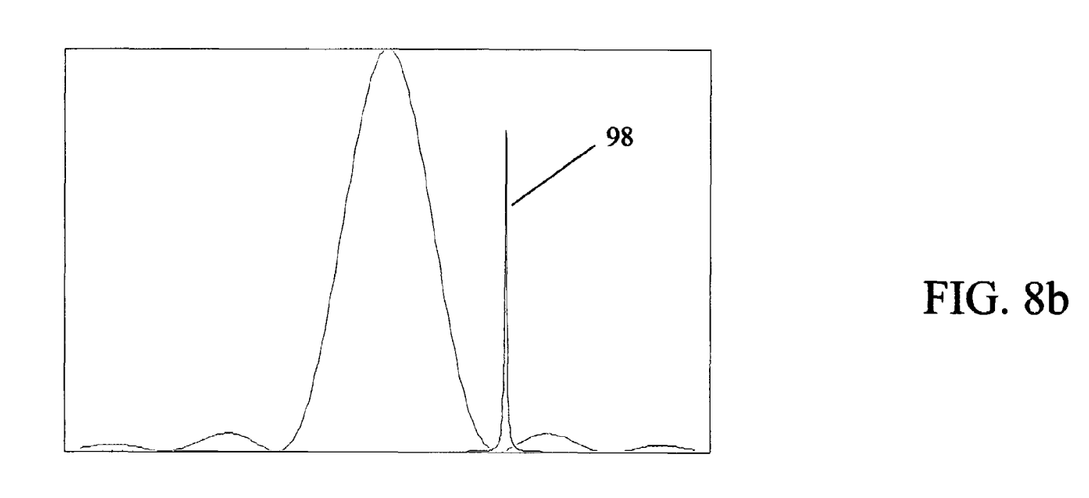

As shown in FIGS. 8a and 8b, the application of stress to the fiber chain makes the material 110 birefringent, i.e. $n_x$ and $n_y$ are different. Vertically polarized light 112 propagates in the cavity from the narrowband fiber grating 98 at one end (1) through the birefringent material (2), which retards the light by a quarter-wave thereby circularly polarizing the light. The circularly polarized light reflects off the broadband grating 92 (3) back through the fiber chain (4) and the birefringent material, which retards the light by another quarter-wave giving it a horizontal-polarization at the narrowband grating 98 (5). As a result, the H-polarized light sees little to no reflection at the laser wavelength, which defines a high loss low Q cavity incapable of sustaining laser oscillation. The reflection band 98 for H-polarized light lies at a wavelength outside the broadband reflection band.

Figure 9:
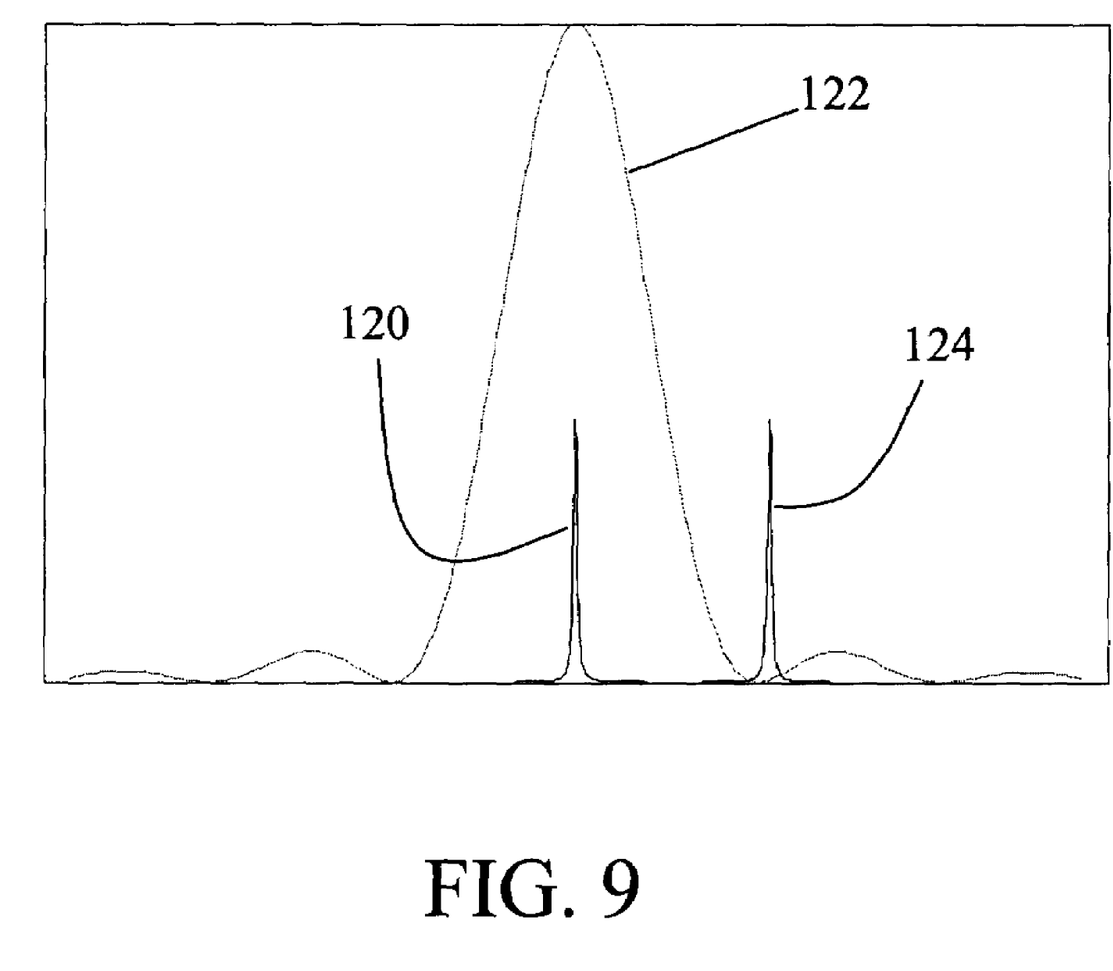
FIG. 9 illustrates the polarization-dependent reflectivity of the narrowband grating to circular or 45 degree polarized light for an alternate embodiment of stress-induced birefringence.

As shown in FIG. 9, the amount of retardance introduced by the birefringence need not be quarter-wave. The retardance need only reduce the effective reflectance/transmission of the cavity enough that the cavity losses exceed the cavity gain. In this case, the round-tip retardance produces a polarization having both V and H components at the laser wavelength. However, as shown only the v-polarized reflection band 120 overlaps the broadband reflection band 122 at the laser wavelength. The H-polarized reflection band 124 lies at a different wavelength outside reflection band 122. As a result, only the V-polarized component is reflected. Thus, the effective reflectance is reduced below the cavity threshold.

Stress-induced birefringence of an all-fiber polarization-dependent resonant cavity defines a new architecture for a Q-switched laser. The all-fiber Q-switched laser can be configured with a variety of glasses, dopants, fibers and gratings to output laser pulses and sequences of pulses at different wavelengths, power levels, mode structures (single and multimode), pulse widths and repetition rates. Referring to FIG. 5, in one embodiment gain fiber 86 is formed of an oxide-based multi-component glass such as phosphate, germanate or tellurite and doped with one or more rare-earth elements (Er, Yb, Nd, Tm, Ho). Multi-component glasses support higher concentrations of rare-earth dopants, e.g. 0.5 to 30 wt. % without quenching or clustering, orders of magnitude higher than conventional silica glasses. These glasses support both higher output powers and shorter cavity lengths needed for single-frequency operation. However, current multi-component glasses are not photosensitive and relatively fragile. Thus, the PM fiber 90 and fiber 94 are suitably formed from passive silica glass and fusion spliced to the gain fiber. A suitable process for fusion splicing thermally dissimilar fiber is described in co-pending U.S. application Ser. No. 10/374,001 entitled "Method of Angle Fusion Splicing Silica Fiber with Low-Temperature Non-Silica Fiber" filed on Feb. 25, 2003 the entire contents of which are incorporated by reference.

Figure 10:
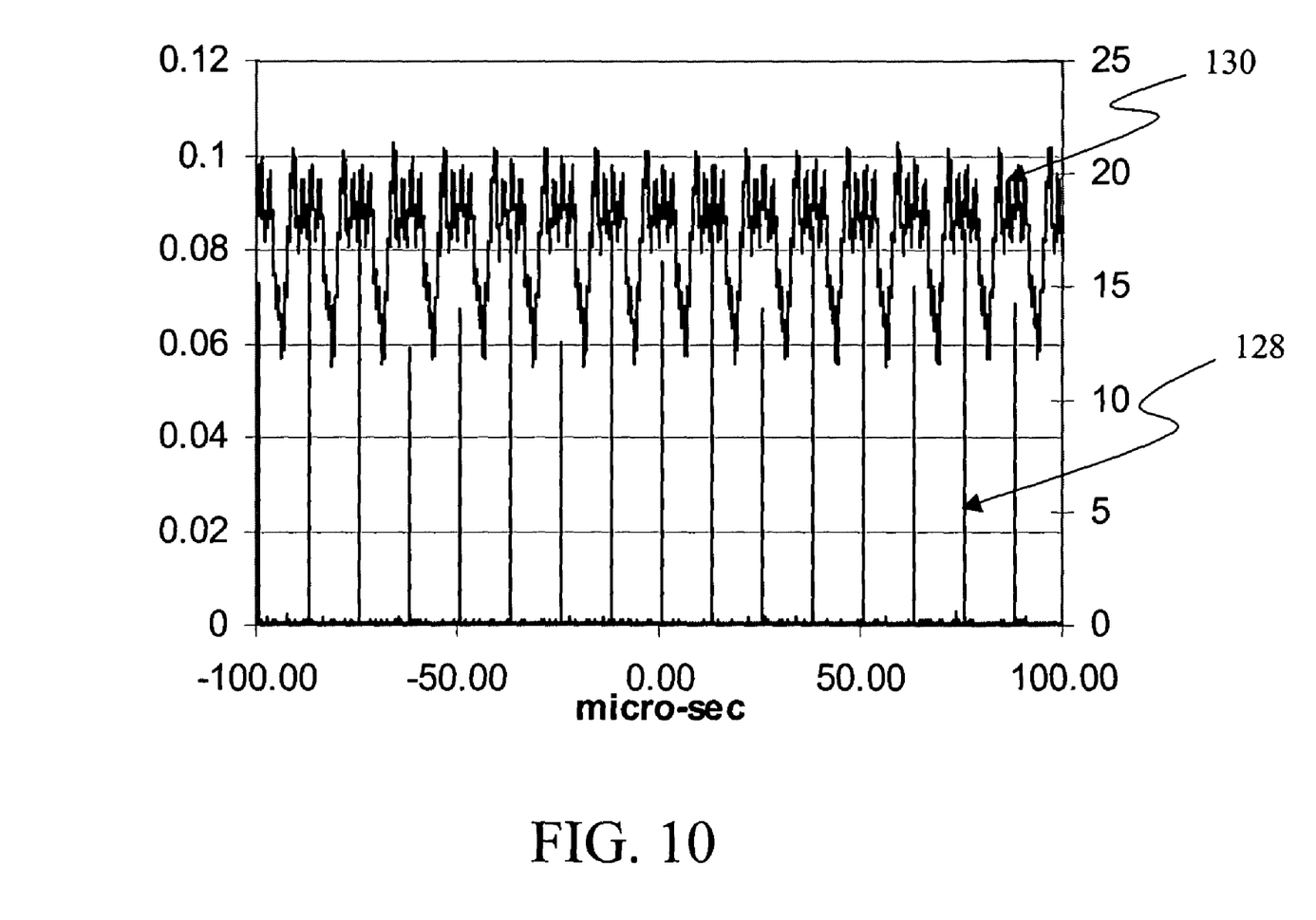
FIG. 10 is a plot of Q-switched laser pulses generated by the all-fiber Q-switched laser.

The all-fiber Q-switched laser was tested with a 2 cm length of gain fiber of phosphate glass doped with 2 wt. % of Er and 2 wt. % of Yb. The gratings were formed in passive silica fiber at a wavelength of 1.55 microns. The narrowband and broadband gratings had a precision $\Delta\lambda$=0.05 nm and 0.3 nm, respectively. The fiber chain was pumped with a 390 mW single-mode pump. As shown in FIG. 10, the PZT was modulated at 100 kHz and generates pulses 130 that stress the fiber. The Q-switched laser generated a sequence of pulses 128 with a FWHM of 15 ns, a peak power of 15 W.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A Q-switched laser, comprising:
a polarization-dependent resonant cavity including a fiber chain having a gain medium between narrowband and broadband fiber gratings, at least one of said fiber gratings and said gain medium being formed in a non-polarization maintaining (PM) fiber;
a pump source that couples energy into the fiber chain to pump the gain medium; and
a modulator that applies stress to a non-PM portion of the fiber chain to induce birefringence and switch the cavity Q-factor to alternately store energy in the gain medium and then release the energy in a laser pulse.

2. The Q-switched laser of claim 1, wherein at least a portion of the fiber chain comprises a polarization-dependent fiber.

3. The Q-switched laser of claim 1, wherein the narrowband fiber grating is formed in a polarization maintaining (PM) fiber creating a pair of reflection bands that correspond to different polarization modes, said broadband grating is formed in the non-PM fiber having a reflection band that is aligned to one of the narrowband grating's reflection bands.

4. The Q-switched laser of claim 1, wherein the modulator comprises a piezoelectric transducer (PZT).

5. The Q-switched laser of claim 1, wherein the retardance of the birefringence is approximately one-quarter wave of the laser pulse.

6. The Q-switched laser of claim 1, wherein the gain medium is formed in an oxide-based multi-component glass fiber and the gratings are formed in passive silica fiber fused at either end of the multi-component glass fiber.

7. The Q-switched laser of claim 1, wherein the length of the resonator is less than 5 cm and the laser pulse is single-frequency.

8. The Q-switched laser of claim 1, wherein full-width half-maximum of the laser pulse is less than 100 ns, the repetition rate of the laser pulse is at least 1 kHz, and the peak power of the laser pulse is at least 1 W.

9. The Q-switched laser of claim 1, wherein the modulator applies stress to the non-PM portion of the fiber chain that does not include the gain medium.

10. The Q-switched laser of claim 1, wherein said fiber chain includes only contiguous section of PM fiber.

11. A Q-switched laser, comprising:
a polarization-dependent resonant cavity comprising,
  a gain fiber,
  a narrowband grating formed in a polarization maintaining (PM) fiber spliced to one end of the gain fiber, said narrowband grating in said PM fiber having two reflection bands that correspond to different polarization modes,
  a broadband grating formed in a non-PM fiber spliced to the other end of the gain fiber, said broadband grating having a reflection band that is aligned to one of the narrowband grating's reflection bands;
a pump source that couples energy into the resonant cavity to pump the gain fiber; and
a modulator that applies stress to the non-PM fiber in the fiber chain to induce birefringence and switch the cavity Q-factor to alternately store energy in the gain medium and then release the energy in a laser pulse.

12. The Q-switched laser of claim 11, wherein the resonant cavity comprises only one section of PM fiber.

13. The Q-switched laser of claim 12, wherein the one section of PM fiber comprises the PM fiber in which the narrowband grating is formed spliced to a PM gain fiber.

14. The Q-switched laser of claim 11, wherein the gain fiber is formed of an oxide-based multi-component glass and the gratings are formed in passive silica fiber fused at either end of the multi-component glass fiber.

15. A Q-switched laser, comprising:
a resonant cavity including a narrowband reflector in a polarization maintaining (PM) fiber creating a pair of reflection bands that correspond to different polarization modes, a gain medium and a broadband reflector having a reflection band that ordinarily overlaps one of the narrowband reflector's reflection bands so that the cavity has a high Q-factor at a laser wavelength and polarization;
a pump source that couples energy into the resonant cavity to pump the gain medium; and
a modulator that affects the polarization of light oscillating in the resonant cavity to reduce the Q-factor to store energy in the gain medium and then return the Q-factor to its high value to release the energy in a laser pulse.

16. The Q-switched laser of claim 15, wherein the reflectors and gain medium are formed in a fiber chain, said modulator applying stress to a non-polarization maintaining portion of the fiber chain to alter its birefringence and change the polarization of the light.

17. A Q-switched laser, comprising:
a polarization-dependent resonant cavity including a fiber chain having a gain medium between first and second fiber gratings, at least one of said gratings formed in a non-polarization maintaining (PM) fiber and at least one of said gratings or said gain medium formed in a PM fiber;
a pump source that couples energy into the fiber chain to pump the gain medium; and
a modulator that applies stress to a non-PM portion of the fiber chain to induce birefringence having polarization axes in the cross-section of the stressed fiber chain and switch the cavity Q-factor to alternately store energy in the gain medium and then release the energy in a laser pulse.

18. The Q-switched laser of claim 17, wherein one of the fiber gratings is formed in the PM fiber.

19. The Q-switched laser of claim 17, wherein the fiber chain includes only one section of PM fiber including said other grating and/or said gain medium.

20. The Q-switched laser of claim 18, wherein said first fiber grating is a narrowband grating that is formed in said PM fiber and said second fiber grating is a broadband grating that is formed in said non-PM fiber.

21. The Q-switched laser of claim 17, wherein the modulator applies stress to the non-PM portion of the fiber chain that does not include the gain medium.

* * * * *